(12) United States Patent
Vlad

(10) Patent No.: US 7,233,829 B2
(45) Date of Patent: Jun. 19, 2007

(54) ELECTRIC FIELD SHARK REPELLENT WET SUIT

(75) Inventor: Vladimir Vlad, Ames, IA (US)

(73) Assignee: Glycon Technologies, L.L.C., Ames, IA (US)

(*) Notice: Subject to any disclaimer, the term of this patent is extended or adjusted under 35 U.S.C. 154(b) by 201 days.

(21) Appl. No.: 11/071,698

(22) Filed: Mar. 3, 2005

(65) Prior Publication Data

US 2005/0197686 A1 Sep. 8, 2005

Related U.S. Application Data

(60) Provisional application No. 60/549,630, filed on Mar. 3, 2004.

(51) Int. Cl.
*A61N 1/00* (2006.01)

(52) U.S. Cl. .................. 607/148; 607/35; 607/144; 607/149; 310/326; 405/186

(58) Field of Classification Search .......... 607/144, 607/148, 149, 2, 15, 35; 2/2.15; 405/185, 405/186
See application file for complete search history.

(56) References Cited

U.S. PATENT DOCUMENTS

| | | | |
|---|---|---|---|
| 2,155,331 A | | 4/1939 | Sadloski |
| 3,164,772 A | * | 1/1965 | Hicks, IV ................ 119/220 |
| 4,485,426 A | | 11/1984 | Kerls |
| 4,602,384 A | | 7/1986 | Schneider |
| 5,028,354 A | | 7/1991 | Smith et al. |
| 5,080,963 A | | 1/1992 | Tatarchuk et al. |
| 5,158,039 A | | 10/1992 | Clark |
| 5,616,333 A | | 4/1997 | Hayes |
| 6,198,204 B1 | * | 3/2001 | Pottenger .................. 310/326 |
| 6,606,963 B1 | | 8/2003 | Wynne |
| 6,809,462 B2 | * | 10/2004 | Pelrine et al. ............. 310/319 |
| 2002/0077689 A1 | * | 6/2002 | Kirkland .................... 607/149 |
| 2003/0233694 A1 | * | 12/2003 | Wescombe-Down ......... 2/2.15 |
| 2006/0145707 A1 | * | 7/2006 | Ooe ......................... 324/661 |

OTHER PUBLICATIONS

Advanced Cerametrics Incorporated, Advanced Materials Technology Company "Piezoelectric Ceramic Fibers", pp. 1-10.
www.nemowetsuit.com/technical_detail Nemo Newsletter "How to make a SCUBA diving westsuit from neoprene", Nemo Bali Wetsuit 2003/2004, pp. 1-4.

(Continued)

*Primary Examiner*—Robert E. Pezzuto
*Assistant Examiner*—Brian T. Gedeon
(74) *Attorney, Agent, or Firm*—McKee, Voorhees & Sease, P.L.C.

(57) ABSTRACT

An article of clothing for use in water includes an electroactive material integrated into the clothing, at least one electrode integrated into the clothing and wherein the electroactive material is adapted to release electrical impulses into the water. A method of generating electrical energy on a person includes wearing clothing with an integrated electroactive material that produces electrical charges upon movement of the person and harvesting electrical energy from the electroactive material for use with an electrical load. An article of clothing includes an electroactive material integrated into the clothing, at least one electrode integrated into the clothing, and wherein the electroactive material is adapted to generate an electrical field around the clothing.

19 Claims, 4 Drawing Sheets

OTHER PUBLICATIONS www.simolexrubber.com/html/cord_04.htmll Simolex Rubber Corporation, Simotex—Cord, Feb. 2004, 1 page.
www.sharkshield.co.za/products.html "Products" Feb. 2004, 6 pages.
www.bishopmuseum.org.research/treks/palautz97rb.html Closed-Circuit Rebreathers What is a Rebreather? 9 pages Feb. 2005.
www.ceramicbulletin.org Focus on Electronics "Applications, Markets Expand for Piezoelectric Ceramics", Sep. 2000 3 pages.
Phillips, James R. "Piezoelectric Technology Primer" 17 pages.
"Discussion of Principles" Mar. 3, 2004—2 pages.

\* cited by examiner

ELECTRIC FIELD SHARK REPELLENT WET SUIT

PRIORITY STATEMENT

This application claims priority to U.S. Provisional Application No. 60/549,630 filed Mar. 3, 2004, hereby incorporated by reference in its entirety.

BACKGROUND OF THE INVENTION

1. Field of the Invention

The present invention relates to apparatus and methods integrating, into clothing or worn articles, components which produce electrical energy based on mechanical strain on, movement of or pressure on the components, making the electrical energy available for use or storage.

2. Problems in the Art

It has been proven by the intense research in the Marine Biology field that many sharks have highly sensitive receptors located in their snouts, known as the Ampullae of Lorenzini. These receptors can detect any form of bioelectrical field generated under water from quite a big distance. When the electrical field becomes too powerful relative to such a shark, it generates muscle spasms in the sharks which tend to repel the shark from the area of the electrical field.

Various devices have been promoted in the marketplace claiming to repel sharks with use electrical fields. Examples are hand held electrical batons, a product called Sharkshield, and others. All of them have proved to be inefficient to use (e.g., they require the user to see the shark first!) or heavy, cumbersome, and expensive. There is a real need in this area for improvement. For example, there is a real need for technology that addresses the demands for a safe water environment for surfers and divers in an efficient and inexpensive way.

There are many times and situations when it is advantageous for a scuba diver or surfer to have an electrically powered device which is accessible and useable. Examples in scuba diving include, but are not limited to, lights and cameras. An example for surfers would be a light or an audible/visible alarm. Various such devices exist, but require electrical power sources, normally batteries. As is well known, batteries tend to be heavy and can be relatively bulky. They also have limited operating time.

There is a real need in this area for improvement. For example, there is a real need for technology that addresses the demands for electrical power in a water environment where it is difficult to have hard-wired connection to an electrical power source and is cumbersome and inconvenient to carry batteries, with their limited operating time.

SUMMARY OF THE INVENTION

Therefore it a primary object, feature, or advantage of the present invention to improve upon or advance beyond the state of the art.

Another object, feature, or advantage of the present invention is to provide a device that generates effective shark or other animal repelling electrical fields around the user.

Yet another object, feature, or advantage of the present invention is to provide a device that eliminates the need for connection to an external electrical power source or to carry batteries as the sole power source.

A further object, feature, or advantage of the present invention is to provide a device that is portable.

A still further object, feature, or advantage of the present invention is to provide a device that is not bulky, heavy, or cumbersome.

Another object, feature, or advantage of the present invention is to provide a device that does not substantially interfere with operation of the clothing or wet suit.

Yet another object, feature, or advantage of the present invention is to provide a device that does not substantially interfere with mobility of the user.

A further object, feature, or advantage of the present invention is to provide a device that is economical.

A still further object, feature, or advantage of the present invention is to provide a device that is durable and relatively long lasting.

Another object, feature, or advantage of the present invention is to provide on the user, an electrical energy generator, which avoids having limited operating times associated with batteries with no renewable source.

One or more of these and/or other objects, features, aspects, embodiments, and examples of the present invention will become more apparent with reference to the accompanying specification and claims.

According to one aspect of the present invention, an article of clothing for use in water includes an electroactive material integrated into the clothing and at least one electrode integrated into the clothing. The electroactive material is adapted to produce electrical impulses for release into the water. The electrode(s) can be disposed on an outer surface of the electroactive material to thereby release electrical impulses directly into the water. The electroactive material can be of various types, including a pressure-activated conductive elastomer (such as rubber), or can include electroactive fibers. The article of clothing can be constructed as a wet suit, a sleeve to position around the body in various locations or can take other forms. The electrical impulses produced by the electroactive material can also be used to drive electrical loads, such as, without limitation, lights, cameras, breathing apparatuses, batteries, or other devices.

According to another aspect of the invention, a method of generating electrical energy on a person includes wearing clothing with an integrated electroactive material that produces electrical charges upon movement of the person and harvesting electrical energy from the electroactive material for use with an electrical load. The electrical load can be an electrode used to produce an electric field or can be a light, camera, breathing apparatus, battery, or other type of electrical load.

According to yet another aspect of the invention, an article of clothing includes an electroactive material integrated into the clothing and at least one electrode integrated into the clothing. The electroactive material is adapted to generate an electrical field around the clothing.

DETAILED DESCRIPTION

Figure 1:
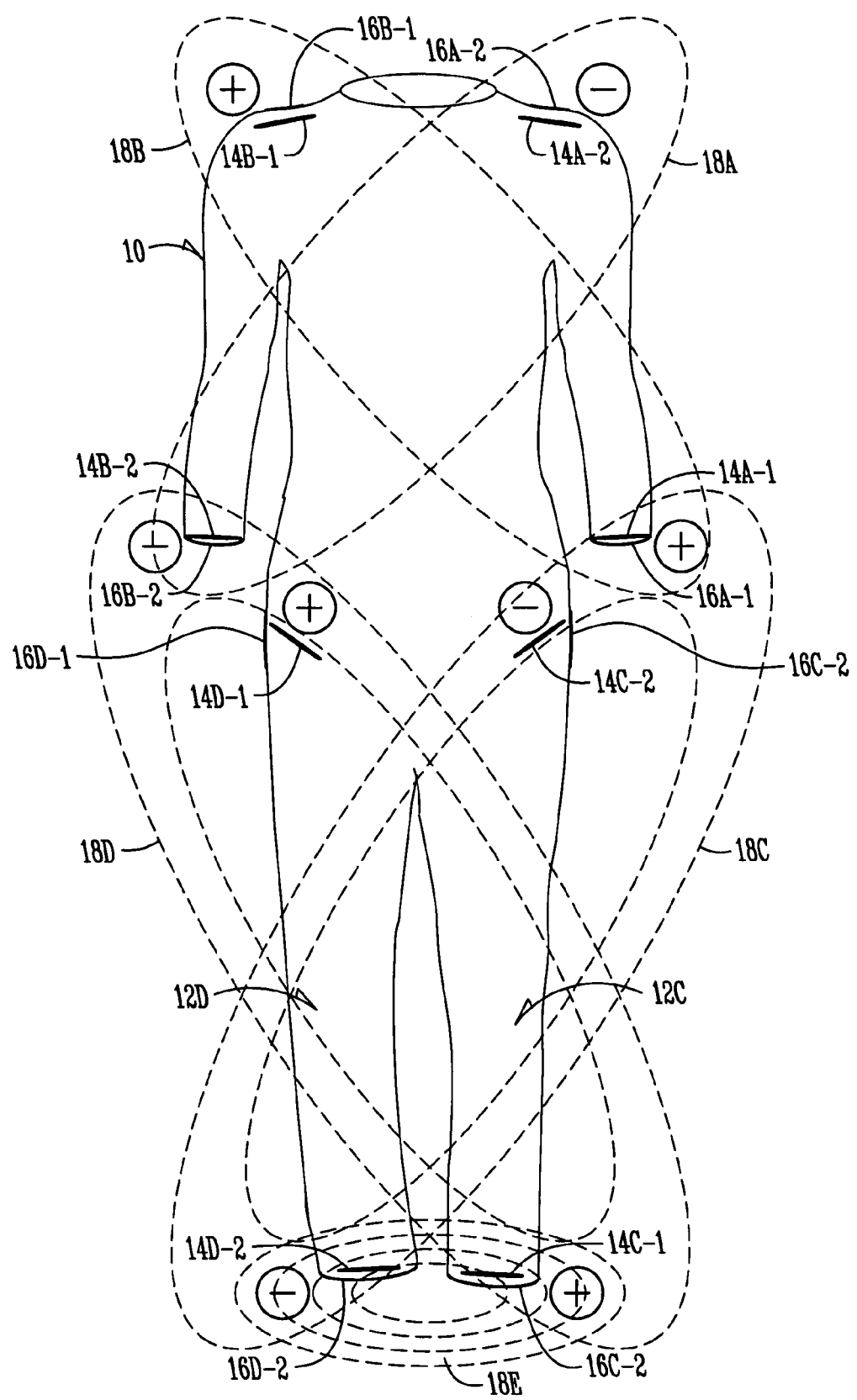
FIG. 1 is a simplified diagrammatic illustration of a wet suit with components according to one aspect of the invention integrated therein, and further diagrammatically illustrating electrical fields that can be set up from operation of those components when the wet suit is worn by a user who is moving in the water.

To obtain a better understanding of the invention, a description of a few exemplary embodiments will now be set forth. The exemplary embodiments are illustrative only and not by way of limitation to the invention. Reference will be taken from time to time to the above-identified drawings. Reference numbers and letters will be used to indicate certain parts and locations in the drawings. The same reference numbers will be used to indicate the same parts or locations throughout the drawings unless otherwise indicated.

FIG. 1 illustrates diagrammatically a full body wet suit 10 according to one aspect and example of the present invention. The wet suit 10 is of conventional configuration except as discussed below. The wet suit may be worn by divers or surfers. It substantially covers the torso as well as arms and legs of the user. A wet suit is shown in FIG. 1 for illustrative purposes only. A wide variety of wet suits are commercially available with a variety of different constructions and features. However, the invention can be integrated into other types of clothing. Examples might be jogging or running suits, underground worker (e.g. miner) clothing, soldier clothing, or outdoors enthusiast clothing. Other uses and applications of the invention are possible.

The basis structure of a commercially available wet suit may include several layers, including a neoprene layer and metal (sometimes titanium) coatings between certain layers. A wet suit of the present invention may have multiple layers.

The wet suit 10 of FIG. 1 differs from conventional wet suits in that, as diagrammatically illustrated at FIG. 1, it includes several sets of PZT fibers or strips integrated into the wet suit fabric at various locations (e.g. one set in each arm and leg, see diagrammatic illustrations at reference numerals 12A–D respectively). By integrated it is meant fibers 12 are operatively installed on wet suit 10. This can include incorporation into the carrier material of clothing (e.g. placement inside a layer of material from which the clothing is made). Alternatively, it could mean partially outside but along the clothing material, or all outside on one side or the other of the clothing material, but preferably attached in a secure fashion (but might be removable).

In this example, the fibers 12 are Piezoelectric Ceramic Fibers PZT 12 are incorporated as strips into the neoprene material, making the wet suit a universal portable electric unit for any form of water activities. The PZT fibers 12 are manufactured by Viscose Suspension Spinning Process (VSSP) method with cross-sections of 10 to 250 μm. The fibers can be made in a form that is like other fabric threads. It therefore can be integrated into fabrics and materials of clothing, including but not limited to wet suits, by known manufacturing methods. The fibers are believed robust enough to take conventional clothing or wet suit manufacturing techniques without material effect on or damage to their function or efficacy. The fibers could replace normal fibers or be added to normal fibers or materials (e.g. formed into the neoprene layer of wet suit 10). They can be placed in just one portion of clothing, or in a plurality of positions. Different sets could be placed in different positions. It may be possible to have different sets of fibers in the same location but harvest the electrical energy separately from each set (or combine the electrical energy).

The fibers could also be strips or other forms. They have electroactive or piezoelectric type properties. They output a voltage when subjected to some mechanical force.

A piezoelectric material is defined as a material that develops an electric charge when pressed or subjected to a force. PE materials transform mechanical work input into electrical output and vice versa. A simple piezoelectric accelerometer consists of a disk-like base of PE material connected to a proof mass. The base is secured to the moving body and electrodes are connected on either side of the disk. When the body accelerates, the proof mass exerts a force on the PE disk and a charge builds up across the electrodes. Piezoelectric accelerometers are called active devices since they generate their own signals, and theoretically do not need to be powered.

The piezoelectric property of ceramics like PZT does not arise simply from its chemical composition. In addition to having the proper formulation the piezoceramics must be subjected to a high electric field for a short period of time to force the randomly oriented micro-dipoles into alignment. This alignment by application of high voltage is called "poling". At a later time, if an electric field is applied in the opposite direction it exerts a "dislodging stress" on the micro-dipoles. Low level applied fields result in no permanent change in the polarization (it bounces back upon removal). Medium fields result in partial degradation of the polarization (with partial loss of properties). High applied fields result in repolarization in the opposite direction.

The most common method is to make a conductive bond between a metal substrate and the piezo part. Then one electrical lead is attached to the substrate, and one to the outward face of the piezoceramic sheet. In cases where a conductive bond is not possible (i.e. when the substrate is glass or plastic), a wire must be soldered to the "down" side of the ceramic at some location and a corresponding 'dish', 'cutout', or 'overhang' must be used to allow room for the wire when bonding the piezo sheet to the substrate.

Many piezoceramic parts come with a thin (~3000 Angstrom units) metallic electrode already on the ceramic. Wire leads can be soldered (use ordinary 60/40 resin core solder) anywhere on the electrode to suit the application/experiment. Most PSI ceramics have thin nickel electrodes and require the use of an additional liquid flux for uniform results.

Each end of a set of PZT fibers 12 is operatively connected to an epoxy multilayer transducer/electrode combination (diagrammatically illustrated at reference numerals 14 and 16) that harvest the electrical energy. In a way, the transducers are like the metal substrate and lead on opposite sides of a monolithic piezoelectric member. Each transducer at opposite ends of the fibers collects the polarized charge that builds up towards its end of the set of fibers. It can be electrically connected to another component; here an electrode. Thus, the transducers 14 at opposite ends of a set of fibers 12 provide two electrical connections of opposite polarity to the plurality of fibers 12 between them. The transducers therefore allow what some call the "harvesting" of electrical energy from multiple PZT fibers, or, in this example, connection of electrodes 16 to create oppositely charged electrodes to create electric or electromagnetic fields, as while be further described below.

As illustrated in FIG. 1, suit 10 has several sets of PZT fibers 12 in different locations. For reference, the various sets are labeled 12A–D, one in each arm (extended roughly between wrist cuff and shoulder), and one in each leg (extended roughly between hip and leg cuff), Further for reference, positive (+) and negative (−) symbols are placed near opposite ends of each set of PZT fibers 12 to illustrate how, at one point in time, polarity at the ends of each set of fibers 12. It is to be understood, however, that polarity may switch back and forth between ends of fibers 12, and therefore that polarity may not be fixed in time. This phenomenon is well known.

Also, for reference purposes in FIG. 1, each transducer 14 is connected at an illustrated positively charged (+) end of a set of PZT fibers 12 is labeled with reference numeral 14, while each transducer 14 connected at an illustrated negatively charged end is labeled 16. The letter and number following reference numeral 14 or 16 then matches the corresponding set of fibers 12 (e.g. transducers 14A-1 and 14A-2 are at opposite ends of fiber set 12A and electrodes 16A-1 and 16A-2 are connected to transducers 14A-1 and 14A-2 respectively, and so on).

The transducers can take different forms. For example, multiple layers of epoxy transducers may be electrically connected to an elastic electrode. These fibers 12 and transducers 14 have long lives (e.g. $200 \times 10^6$ cycles without properties diminishing).

The electrodes can be silicone pads or strips that can be integrated into the cuffs of wet suit 10. Thus, the electrode can be elongated strip or fiber electrodes. As an alternative, electrodes may be incorporated into a neoprene cuff. The underwater pressure and the motion of the diver or surfer will generate a protective elliptic electric or electromagnetic field via electrodes (e.g. elastic conductive silicon rubber members) introduced into the wet suits' sleeves and pants. With an electronic switch (not shown) incorporated, for example, into the cuff's sleeve, the whole device can be manually activated or deactivated by the user whenever desired (e.g. at immersion).

As diagrammatically illustrated in FIG. 1, elliptical electrical fields would set up between positive and negative electrodes 14 and 16.

An electric field is always associated with the presence of electric charges. It fills the space around the charge and is the mechanism of interaction between charges. A test particle with small known charge (Q) placed near a charge concentration will experience an accelerating force (F) due to the field. The value of the electric field (E) at that location is the ratio F/Q (a vector).

Thus, as can be seen, when wet suit 10 is worn, the user would be substantially enveloped in electric or electromagnetic fields, at least with respect to the wet suit 10 relative the user's body. As can be appreciated, the number of fields can be designed by the number and placement of electrodes. There could be just one field or more than shown in FIG. 1. The PZT fibers with transducers and electrodes can be incorporated into at least a portion of wet suit 10. When that portion of the wet suit is moved, bent, or experiences pressure (which can occur by movement of the diver's arms or legs, or just pressure of water against the fibers, either by water pressure below surface or water against the wet suit as the diver moves relative the water and/or water moves relative the diver), the PZT fibers produce the direct piezoelectric effect.

In this example, the electrical energy is collected into opposite charges at opposite ends of each set of fibers. The electrodes then present opposite charges and a potential difference at spaced apart positions on wet suit 10 to the environment immediately around wet suit 10. When immersed, the water acts as a conductor to help set up the electric field between opposite polarity electrodes. As stated, sharks have sensory apparatus that detect and react physiologically to electrical fields. Therefore, for sharks or other animals having similar sensitivity, the generated electrical field can act as a repellant. The diver or surfer can be substantially enveloped in shark repelling electrical fields by utilization of multiple sets of PZT fibers and multiple transducers/electrodes at spaced apart positions on the suit.

As illustrated in FIG. 1, multiple elliptic electric fields are orientated, e.g., from the left hand to the right hand, from the left hand to the right leg, from the right hand to the left leg and from the left leg to the right leg.

It should be noted that one advantage of the arrangement of FIG. 1 is believed to be that the electric fields will vary over time. As the diver moves, the amount of movement while vary. The distance between some electrodes will vary. The amount of mechanical strain on fibers 12 will vary. This will, of course, cause the fields to vary in intensity and position over time. It is believed this represents an advantage in repelling sharks, as it is believed that sharks may become used to more constant fields, such as are believed to be created by hand held device and systems that have two electrodes that do not vary in distance much while in use. Varying electrical fields will likely present a more alarming and annoying condition to sharks, and thus be a better repellant.

The system of FIG. 1 is less bulky than prior art systems, does not require a battery, is less restrictive and cumbersome, and is believed to be less costly. It improves mobility and provides a continuous renewable energy source. Nothing must be carried in the user's hands.

Another advantage of the technology of the present invention, apart from its portability and cost, is that if the shark will bite into the wet suit, an electrical shock will be discharged into its mouth in direct proportional with the bite size.

Figure 2:
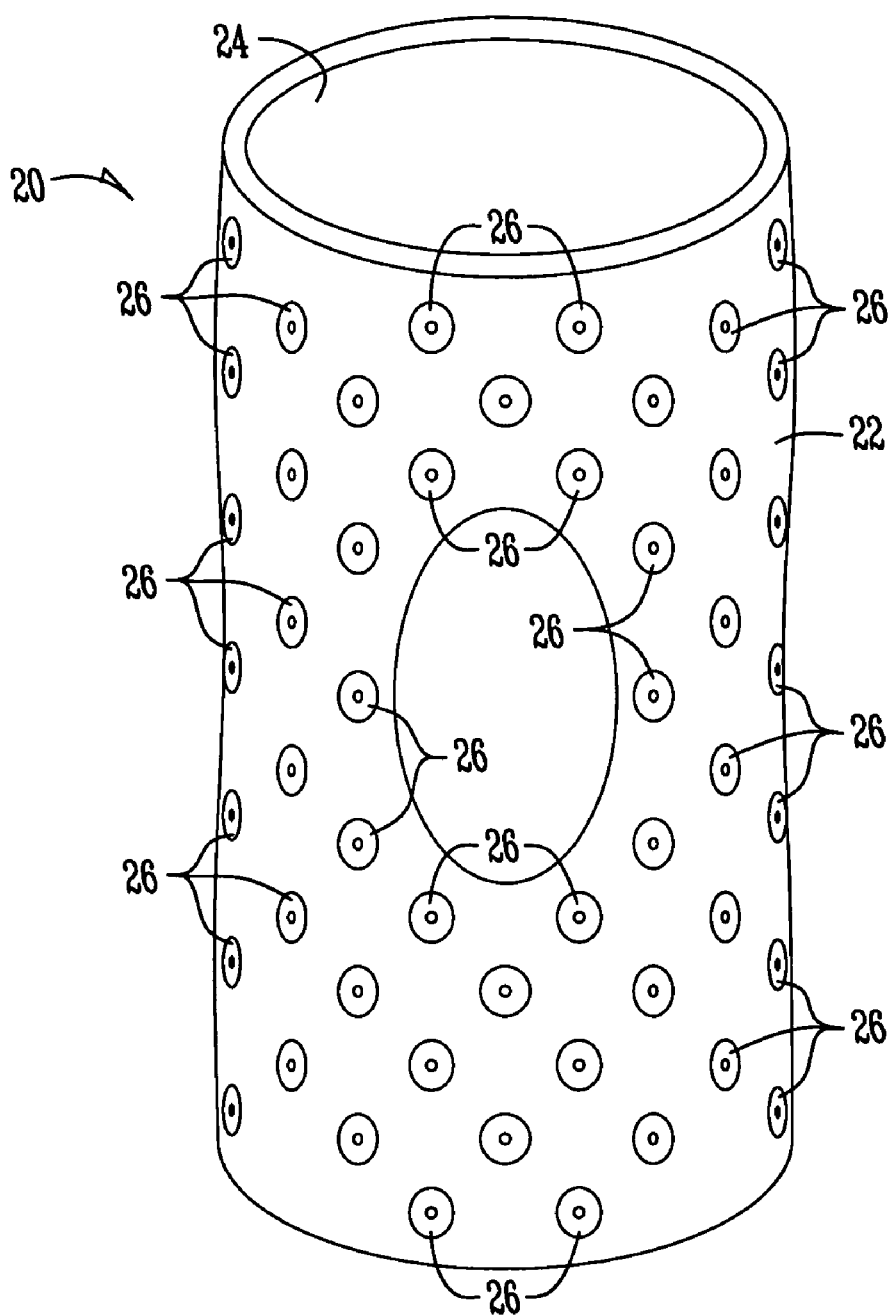
FIG. 2 is an elevated front view of one embodiment of the present invention showing a sleeve that can be worn by a diver or incorporated into a wet suit.
Figure 3:
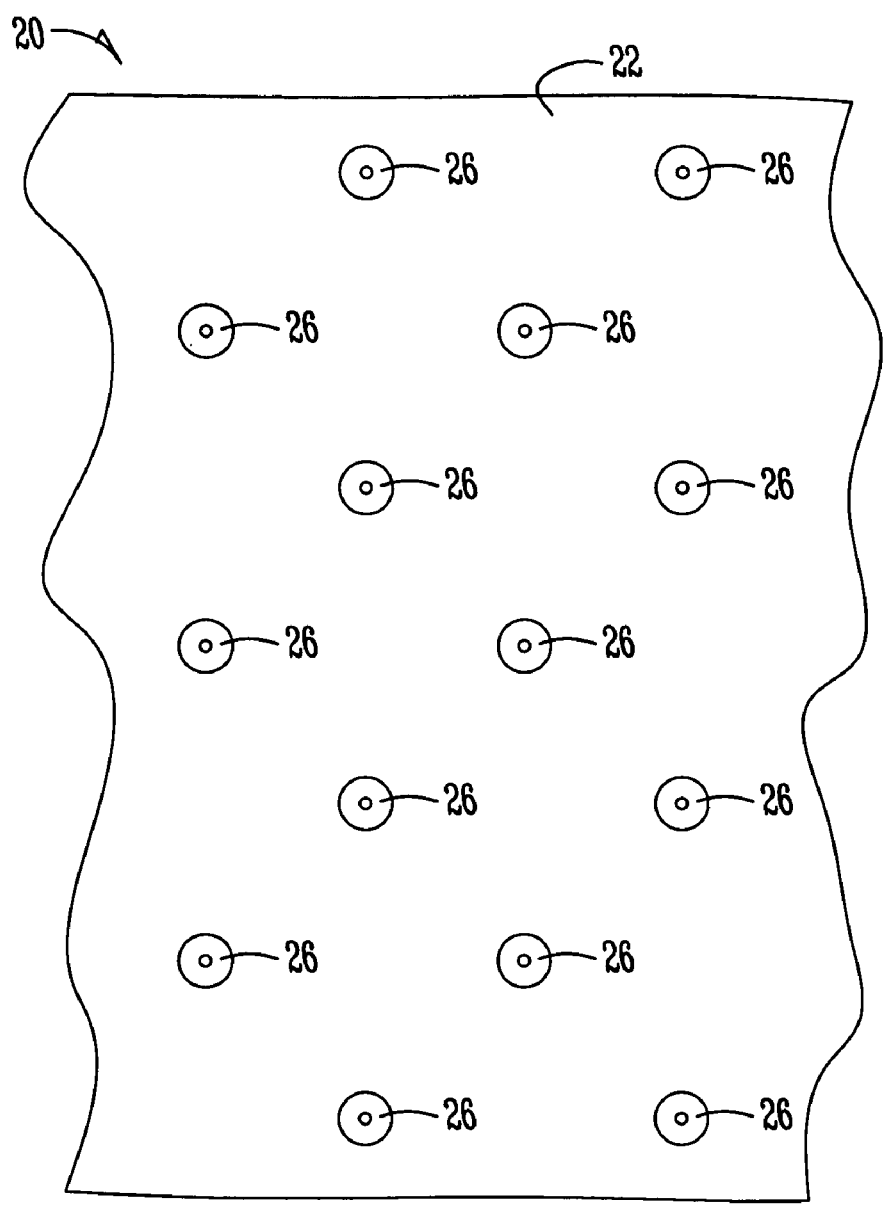
FIG. 3 is a view showing an outside surface of material to be used for generating electric fields.

FIG. 2 illustrates another embodiment of the present invention. In FIG. 2, a sleeve 20 to be worn by a diver or surfer is shown, although the material of the sleeve 20 may also be used as a part of a wet suit or incorporated into other types of clothing as may be appropriate for a particular use. The sleeve 20 is formed of an electroactive material. Preferably, the sleeve 20 is formed from a pressure-activated conductive rubber or polymeric foam such as those described in U.S. Provisional Patent Application No. 60/646,265 filed Jan. 24, 2005, herein incorporated by reference in its entirety. In such an application, the sleeve 20 is formed form an appropriate pressure-activated conductive rubber (although other elastomers may be used). The sleeve 20 has an inside surface 24 and an outside surface 22. There are a plurality of conductive (preferably metallic) eyelet electrodes 26 distributed throughout the outside surface 22. The integrated electrodes 26 receive electrical impulses directly proportional with the pressure and/or time applied on the sleeve 20. Thus, based on the movement of a user and the amount of movement, electrical impulses are created which may be used to repel a shark. In operation, as a diver moves through the water, the pressure of the water against the sleeve 20 creates electrical impulses at the electrodes 26 which repel sharks. Should the diver actually see a shark, become somewhat anxious, and attempt to swim away, the intensity of the electrical impulses would increase thereby intensifying the repellant effect.

Note that any number of electrodes may be used, the electrodes may be of different sizes, and the electrodes can be positioned in any number of arrangements as may be appropriate for a particular application. FIG. 2 merely illustrates one example of a configuration.

It is preferred that the electroactive material used in the physiotherapeutic device can be formed with an appropriate pressure-activated conductive rubber or polymeric foam prepared through sonic homogenization. One method of forming an appropriate electroactive material is to sonically homogenize a mixture of an electroactive powder and a conductive rubber, conductive elastomer, or conductive polymeric foam. One example of an appropriate conductive rubber is ZOFLEX ZL 60.1 pressure-activated conductive rubber. Ultrasound is applied to a mixture (such as a 1:1 mixture) of an electroactive powder such as a Terfernol-D ($Tb_3$ $Dy_7$ $F_e$) powder, or EC-65, EC-97 or EC-98 electroceramic powders. The ultrasound frequency can be 20 KHz. The mixture is polarized through application of a DC voltage to produce a closed cell formation. The material can be further polarized under high compressed pressure.

As indicated earlier, the basic configuration of PZT fibers integrated into clothing can generate electrical energy which can be harvested. Similarly, electrical energy may also be harvested from other embodiments of electroactive material. Another aspect of the invention would be to harvest the electrical energy from the electroactive material such as fibers 12 in suit 10 and either utilize it for some electrical load, or store it in some type of battery for future use.

If the fibers are incorporated into clothing such as wet suit 10, they could be selected to produce electrical energy to power such loads as lights or underwater cameras. Having a renewable, continuous local source of electrical energy might allow for longer, more sustained dives or longer continuous filming under water, including at substantial depths.

Those leads from a transducer can be connected to an electrical load or a battery. If there are multiple sets of fibers 12 and transducers 14, all or some could be connected to the electrical load or battery, or both. Alternatively, some could be connected to the load and some to a battery or batteries.

A similar configuration for generating electrical energy could be integrated into other clothing. Examples might be running suits to power a light for nighttime running, a miner's suit to power a hard hat light, insulated underwear for a snow skier or mountain climber to power a light or radio or alarm device. Of course, the types of applications and types of loads is almost limitless, so long as enough electrical energy can be generated for the intended function.

One specific scuba diving application would be to use the electrical energy generated from wet suit 10 to power an electrically powered underwater rebreather apparatus. For example, it can replace the battery in the MARK 15 used by USA Navy (rebreather diving system). There are distinct military advantages for soldiers using a rebreather as opposed to not using a rebreather (e.g. less likelihood of detection due to elimination of air bubbles).

Another aspect of the invention could utilize the basic electrical energy generating combination of example 2 above, PZT fibers 12 integrated into a wet suit 10 with one or more transducers 14 to harvest electrical energy from fibers 12. The leads from the transducer could be connected directly or indirectly to one of the metallic layers in wet suit 10 to use the electrical energy generated by fibers 12 to cause heating of the metallic layer to warm the diver or surfer or user of the wet suit.

With an incorporated thermostat (not shown), the electricity generated by the PZT fibers can be guided towards the internal layer of Titanium coating of, for example, Titanium Alpha wet suits, e.g., a YAMAMOTO CORPORATION commercially available product. In this way, a constant level of temperature will protect the divers, regardless the water temperature. This could reduce or eliminate the need for heavy dry or 5-7 mm semi-dry suits.

Figure 4:
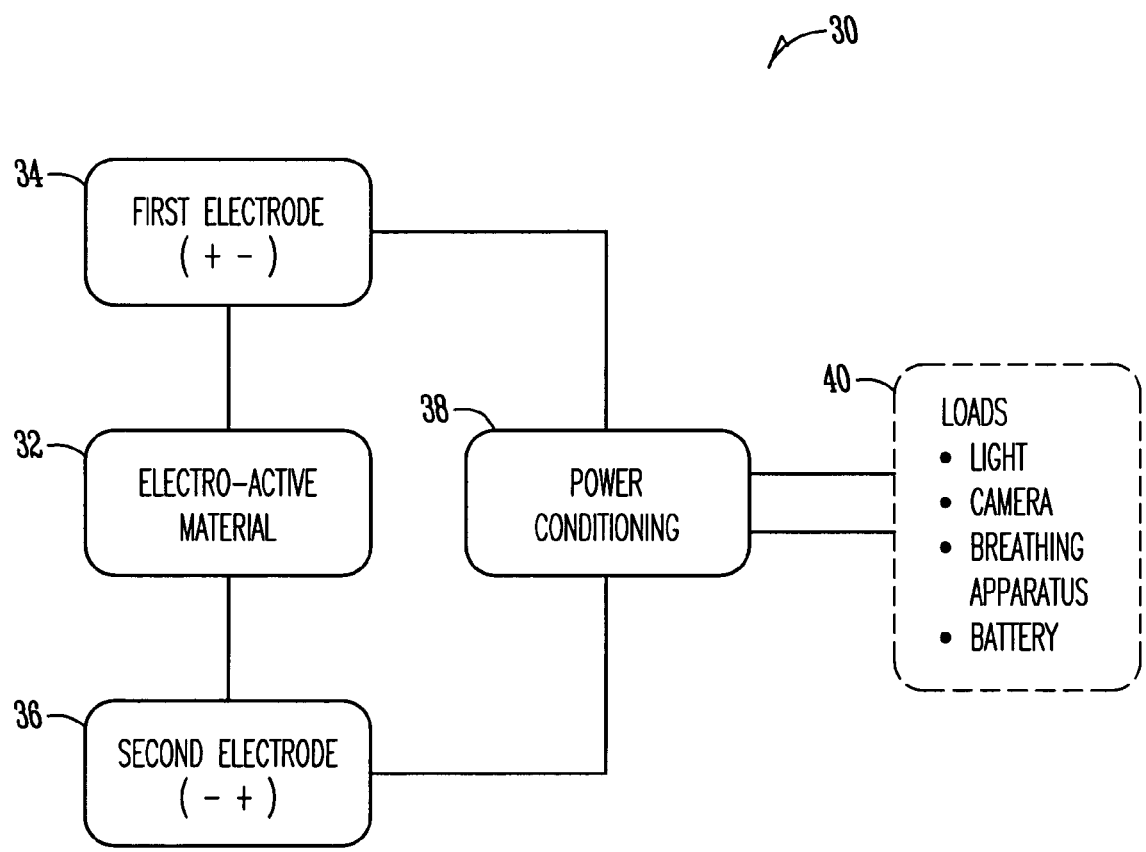
FIG. 4 is a schematic illustrating one embodiment of how electroactive material of the present invention is harnessed to power loads such as lights, cameras, breathing apparatus, and batteries.

FIG. 4 illustrates one embodiment of the use of the electroactive material to power loads. As shown in FIG. 4, an electroactive material 32 is operatively connected to a first electrode 34 and an opposite second electrode 36. The differential between these electrodes produces a voltage differential at a power conditioning circuit 38. The power conditioning circuit can take any number of forms as may be appropriate in a particular application or environment. The conditioned signal can then be used to drive one or more loads 40. Examples of loads that may be driven include, without limitation, lights, cameras, breathing apparatus, and batteries. Electricity produced by suit 10 might be used to produce oxygen from water or filter air so that a scuba diver could wear a suit and helmet to provide underwater breathing needs. Another possibility is to power some sort of device such as sonar, radar, or other similar device for use of the diver underwater.

An inertial sensor, such as are commercially available, or some other commercially available device, could sense the amount of movement of the user. It could be used, for example, to automatically increase intensity of the electricity output by the suit (e.g. increase magnitude of electric fields for shark repellant) if it senses reduces user movement. It could do this by some circuitry to increase the field, or possibly by tapping into stored energy in a battery just in those times. When the diver is moving more robustly, it could sense the same and reduce the amount of energy used (or divert excess into a battery for later use). It might also simply be hooked to some type of alarm or notification device to tell the diver to increase movement to maintain a certain strength of shark repelling field.

Thus, an article of clothing has been disclosed suitable for producing electrical impulses for various applications, including repelling of sharks. The present invention has numerous embodiments and contemplates numerous variations in the types of materials, structures, configurations, and other variations.

What is claimed:

1. An article of clothing for use in water, comprising:
   an electroactive material integrated into the clothing;
   at least one electrode integrated into the clothing;
   wherein the electroactive material is adapted to release electrical impulses into the water; and
   wherein the electroactive material comprises at least one set of electroactive fibers oriented to have opposite ends of opposite electrical polarity.

2. The article of claim 1 wherein the at least one electrode are disposed on an outer surface of the electroactive material to release electrical impulses directly into the water.

3. The article of claim 1 wherein the electroactive material is a pressure-activated conductive elastomer.

4. The article of claim 2 wherein the clothing is a wet suit.

5. The article of claim 1 wherein the clothing is a sleeve.

6. The article of claim 1 further comprising transducers operatively connected to the opposite ends of each of the at least one set of electroactive fibers and one of the at least one electrodes is operatively connected to the transducer.

7. The article of claim 6 wherein the transducer is a multilayer laminate composite transducer.

8. The article of claim 1 wherein the article is adapted to produce electrical fields that can be sensed by sharks.

9. The article of claim 1 further comprising an electrical load operatively connected to the at least one electrode.

10. The article of claim 1 wherein the electroactive fiber is piezoelectric fiber.

11. The article of claim 1 wherein the each of the at least one electrode is an elastic silicone pad.

12. A method of generating electrical energy on a person comprising:
 wearing clothing with an integrated electroactive material that produces electrical charges upon movement of the person;
 harvesting electrical energy from the electroactive material for use with an electrical load; and
 wherein the electroactive material comprises at least one set of electroactive fibers oriented to have opposite ends of opposite electrical polarity.

13. The method of claim 12 wherein the electrical load is an electrode to produce an electric field.

14. An article of clothing, comprising:
 an electroactive material integrated into the clothing;
 at least one electrode integrated into the clothing; and
 wherein the electroactive material is adapted to generate an electrical field around the clothing; and
 an electrical load operatively connected to the at least one electrode.

15. An article of clothing for use in water, comprising:
 an electroactive material integrated into the clothing;
 at least one electrode integrated into the clothing;
 wherein the electroactive material is adapted to release electrical impulses into the water; and
 an electrical load operatively connected to the at least one electrode.

16. The article of claim 15 wherein the electrical load comprises a light.

17. The article of claim 15 wherein the electrical load comprises a camera.

18. The article of claim 15 wherein the electrical load comprises a breathing apparatus.

19. The article of claim 15 wherein the electrical load comprises a battery.

* * * * *